United States Patent
Dym et al.

(10) Patent No.: US 11,483,672 B2
(45) Date of Patent: *Oct. 25, 2022

(54) DYNAMIC GEOFENCE RADIUS

(71) Applicant: INTUIT INC., Mountain View, CA (US)

(72) Inventors: Jacob Wesley Dym, Boise, ID (US); Akshay Kansal, Boise, ID (US)

(73) Assignee: INTUIT, INC., Mountain View, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 17/158,257

(22) Filed: Jan. 26, 2021

(65) Prior Publication Data

US 2021/0274307 A1 Sep. 2, 2021

Related U.S. Application Data

(63) Continuation of application No. 16/805,377, filed on Feb. 28, 2020, now Pat. No. 10,939,235.

(51) Int. Cl.
*H04W 4/02* (2018.01)
*H04W 4/021* (2018.01)
*G06Q 10/10* (2012.01)

(52) U.S. Cl.
CPC ........ *H04W 4/022* (2013.01); *G06Q 10/1091* (2013.01); *H04W 4/02* (2013.01)

(58) Field of Classification Search
CPC ....... H04W 4/02; H04W 4/021; H04W 4/027; H04W 4/029; H04W 40/20; H04W 48/10;
(Continued)

(56) References Cited

U.S. PATENT DOCUMENTS

| 7,343,306 | B1 | 3/2008 | Bates et al. |
| 2003/0004952 | A1 | 1/2003 | Nixon et al. |

(Continued)

FOREIGN PATENT DOCUMENTS

| EP | 2806410 A1 | 11/2014 |
| EP | 3511873 A1 | 7/2019 |

OTHER PUBLICATIONS

International Search Report and Written Opinion issued to PCT/US2020/033367 dated Aug. 26, 2020.

*Primary Examiner* — Jean A Gelin
(74) *Attorney, Agent, or Firm* — Patterson & Sheridan, LLP

(57) ABSTRACT

Aspects of the present disclosure provide techniques for dynamic location tracking. Embodiments include receiving a plurality of location records associated with a site, wherein each respective location record of the plurality of location records comprises respective location coordinates of a respective device associated with the respective location record. Embodiments include determining respective distances from a center point of the site to the respective location coordinates in each respective location record of the plurality of location records. Embodiments include determining a radius of a region definition for the site based on the respective distances. Embodiments include receiving a device location from a device associated with a user. Embodiments include performing, based on the device location and the region definition, one or more location-based operations.

20 Claims, 5 Drawing Sheets

(58) Field of Classification Search
CPC ..... H04W 4/025; H04W 84/18; H04W 88/08; H04L 67/18; H04L 67/22; G06Q 10/1091; G06Q 10/063114; G06Q 10/10; G06Q 30/0261
See application file for complete search history.

(56) References Cited

U.S. PATENT DOCUMENTS

| | | |
|---|---|---|
| 2003/0182435 A1 | 9/2003 | Redlich et al. |
| 2004/0248586 A1 | 12/2004 | Patel et al. |
| 2013/0103697 A1 | 4/2013 | Hill et al. |
| 2014/0004886 A1 | 1/2014 | Gillett et al. |
| 2014/0304301 A1 | 10/2014 | Reavis |
| 2015/0304123 A1 | 10/2015 | Hall |
| 2015/0343214 A1 | 12/2015 | Jain |
| 2016/0357768 A1 | 12/2016 | Strong et al. |
| 2017/0099579 A1* | 4/2017 | Ryan ................... H04M 3/5116 |
| 2017/0270681 A1 | 9/2017 | Kirmani et al. |
| 2018/0007149 A1* | 1/2018 | Gauglitz ................ H04L 67/22 |
| 2019/0340876 A1 | 11/2019 | Northrup et al. |

* cited by examiner

DYNAMIC GEOFENCE RADIUS

CROSS-REFERENCE TO RELATED APPLICATIONS

This Application is a continuation of and hereby claims priority under 35 U.S.C. § 120 to pending U.S. patent application Ser. No. 16/805,337, filed on Feb. 28, 2020, the contents of which are incorporated herein by reference in their entirety.

INTRODUCTION

Field of the Disclosure

Aspects of the present disclosure relate to techniques for dynamic location tracking. In particular, embodiments described herein involve dynamically determining a radius of a geofence based on location records.

Background

Geofences may be virtual perimeters for geographic areas that are used by location-based services to perform tasks related to a user's location. For example, a location-based service associated with a mobile phone may use geolocation to detect the entry into and/or exit from a geofence by a user of the mobile phone. The location-based service may then generate a notification related to the geofence, such as a recommendation to clock into a job associated with the geofence, a greeting from a merchant within the geofence, an email informing other users of the user's arrival within the geofence, or another type of notification or action. In another example, the location-based service may enable and/or disable one or more settings on the mobile phone based on the user's entry into and/or exit from the geofence.

However, conventional techniques for determining the boundaries of geofences may not achieve optimal results due to changing conditions associated with locations. For example, a street closure outside of an office building may result in employees and customers temporarily parking farther away from the office building. If the radius of a geofence for the office building is static, such as if it is set to a fixed value, then it may not encompass the expanded parking region during the street closure. As such, opportunities for providing location-based services may be missed.

Hence, there is a need for improved techniques for determining the boundaries of geofences.

BRIEF SUMMARY

Certain embodiments provide a method for dynamic location tracking. The method generally includes: receiving a plurality of location records associated with a site, wherein each respective location record of the plurality of location records comprises respective location coordinates of a respective device associated with the respective location record; determining respective distances from a center point of the site to the respective location coordinates in each respective location record of the plurality of location records; determining a radius of a region definition for the site based on the respective distances; receiving a device location from a device associated with a user; and performing, based on the device location and the region definition, one or more location-based operations.

Other embodiments provide a system, comprising one or more processors and a memory comprising instructions that, when executed by the one or more processors, cause the system to perform a method for dynamic location tracking. The method generally includes: receiving a plurality of location records associated with a site, wherein each respective location record of the plurality of location records comprises respective location coordinates of a respective device associated with the respective location record; determining respective distances from a center point of the site to the respective location coordinates in each respective location record of the plurality of location records; determining a radius of a region definition for the site based on the respective distances; receiving a device location from a device associated with a user; and performing, based on the device location and the region definition, one or more location-based operations.

Certain embodiments provide a method for dynamic location tracking. The method generally includes: receiving an indication from a device associated with a user that an automatic clock-in feature is enabled; receiving a plurality of location records associated with a site, wherein each respective location record of the plurality of location records comprises respective location coordinates of a respective device associated with the respective location record; determining respective distances from a center point of the site to the respective location coordinates in each respective location record of the plurality of location records; sorting the respective distances in ascending order; determining a radius of a region definition for the site such that a given percentage of the respective distances are less than the radius; receiving a device location from the device associated with the user; determining that the device location is within the region definition based on the radius; and automatically clocking the user into the site based on the automatic clock-in feature.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
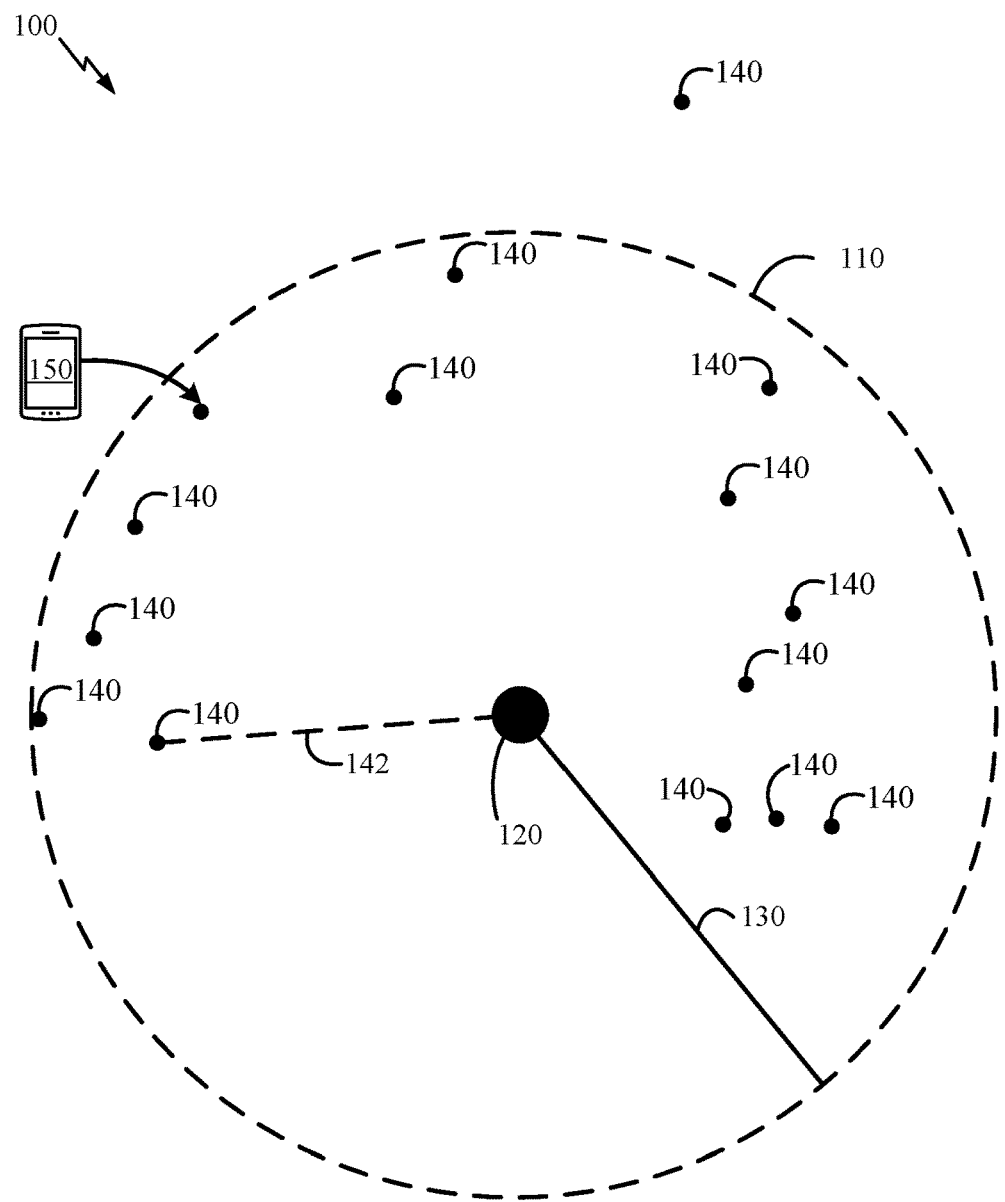
FIG. 1 depicts an example of dynamic location tracking.

Aspects of the present disclosure provide apparatuses, methods, processing systems, and computer readable mediums for dynamic location tracking.

Techniques described herein relate to region definitions, such as geofences, which are virtual perimeters for geographic areas that may be used by location-based services to perform tasks related to a user's location.

For example, a timekeeping system may allow users to clock into jobs at certain locations, and may use region definitions for the locations to determine whether a user is likely to or should clock into a job at a given location. The location-based service may, for example, automatically clock users in or out (e.g., if the users have enabled an automatic timekeeping feature), provide recommendations to users to clock in or out, provide predictions that users will clock in or out to owners of locations, and perform other tasks based on the region definitions.

In other examples, a location-based service may provide users with content based on the users' presence in areas represented by region definitions, such as advertisements, promotions, or other types of content related to establishments within the areas. In another example, a location-based service may track users' travel data for accounting and/or tax purposes. Users of such services may be associated with employers (e.g., ride-share companies or contractors). In one example, a user works for an air conditioning repair company that has a large customer base in a metropolitan area and each customer's building or house is associated with a region definition that defines a circular region surrounding the building or house (e.g., encompassing parking areas).

In order to improve location-based services, embodiments of the present disclosure involve dynamically determining boundaries of region definitions based on user activity.

User activity includes location records, each of which is a record of an instance where a user recorded the user's presence at a site (e.g., by clocking in to a site). A site may be, for example, a building, a residence, an outdoor regions such as a park, or the like. A region definition includes a center point and a radius for a site, and is used to provide location-based services, such as automatic clocking in to a site, for users present in the area defined by the center point and radius of the region definition. A physical address of a site may be used to determine a center point of a region definition for the site.

In one embodiment, location records of a plurality of users are used to dynamically determine a radius of a region definition. A location record may, for example, correspond to an instance where a user clocked in to a site, and generally includes device location data (e.g., coordinates determined by a satellite positioning system associated with the user's device) and an identifier of the site (e.g., an address of the site).

In certain embodiments, a plurality of location records associated with a given site are used to determine a radius within which most or all users clock into the site so that future location-based services may be more accurately provided for the site based on the region definition. A center point of the site may be defined by an owner of the site (e.g., a user that manages the site, such as an employer) or may be determined based on a physical address of the site. For example, a physical address may be queried to a mapping service in order to retrieve a coordinate center point or a parcel perimeter from which a center point may be determined. A distance from the center point to the device location of each of the plurality of location records is determined. Each distance may be calculated as a Euclidean distance from coordinates of the center point to coordinates of a given device location. In some embodiments, the distances are sorted in ascending order. The radius of the region definition is then set to a value greater than or equal to at least a percentage of the distances.

Once the radius is determined, the region definition for the site may be used to perform a variety of location-based services, such as the examples described herein and others. In certain embodiments, the radius is dynamically updated over time as new location records are received for the site.

In one example, a new parking lot is opened for the site that is outside of the existing region definition. As employees and/or visitors begin to manually clock into the site from the new parking lot, the new location records associated with these clock-in activities are received. In some embodiments, the radius is updated at regular intervals, such as daily, or every time a certain number of location records have been received since the last update. Distances from the center point of the site to device locations in the new location records are determined. All of the distances, including those for the new location records and those for the previous location records, are sorted in ascending order, and an updated radius for the site is set to a value greater than or equal at least a certain percentage (e.g., 99.7% or some other subset) of the distances. As such, the region definition is automatically adapted over time as conditions change, such as the addition or closure of parking lots, streets, and the like. In some embodiments the radius is automatically updated, such as if an owner of the site has selected a dynamic radius feature, while in other embodiments updated radii are recommended to the owner of the site. Once the radius is updated, future location-based services can be provided to users that are present within the region definition, which will be more accurate due to the dynamic radius.

While many embodiments involve a dynamic radius and a fixed center point for a site, such as based on an address of the site, or some other arbitrary definition, some embodiments may also involve dynamically determining a center point based on location records. For instance, the center point may be dynamically determined by calculating centermost coordinates of a region encompassing all or a subset of device locations associated with the site.

Embodiments of the present disclosure improve location tracking by allowing for accurate and dynamic boundaries to be determined for region definitions. While conventional techniques involve a fixed or manually determined radius for a region definition, techniques described herein use location records for a site to dynamically determine and update a radius for a location definition, thereby allowing actual conditions to be reflected in the region definition, particularly as circumstances change over time. Improved boundaries of region definitions allow for more accurate determinations of when location-based services for a site should be provided for given users. For example, recommendations, automatic clocking in and out, advertisements, predictions, tracking for tax and accounting purposes, and other services that are based on the presence of users in region definitions can be provided with greater confidence and accuracy.

Examples of Dynamic Location Tracking

FIG. 1 illustrates an example 100 of dynamic location tracking.

In example 100, a plurality of device locations 140 are associated with a plurality of location records for a site. Each of device locations 140 represents coordinates of a given device of a user at a time when the user clocked into the site. A center point 120 of the site represents coordinates of a physical address of the site. The site may, for example, be a professional building, a residential building, an outdoor location (e.g., a park or amphitheater), or another type of location for which location-based services are provided. In one embodiment, the site is a construction site, and device locations 140 represent locations of devices of users that clocked in to a job at the construction site.

While in conventional techniques a radius of a region definition may be manually determined or set to a fixed amount, radius 130 of region definition 110 for the site is dynamically determined based on device locations 140. In some embodiments, techniques described herein for dynamically determining a radius of a region definition are performed by a location tracking service, such as location tracking service 514 of FIG. 5A, described below. A distance from center point 120 to each device location 140 is determined. For example, distance 142 from center point 120 to a given device location 140 is determined by calculating a Euclidean distance from the given device location 140 to the center point.

The distances are then sorted in ascending order, and radius 130 is set to a value greater than or equal to a predetermined percentage of the distances. While radius 130 may be set to a value greater than or equal to all of the distances, this may not always give the best results, as the farthest distance may correspond to an anomaly or an incorrect location record, such as if a user mistakenly clocked into the site from a different location. As such, some embodiments involve setting radius 130 to a value greater than or equal to a given percentage of the distances. The percentage may, for example, be a fixed value that is based on statistical theories. In one example, the percentage is 99.7%, which includes all values within three standard deviations. For example, the radius may be set to the $99.7^{th}$ percentile value of the sorted distances. Other embodiments may use different percentages, such as 95%, 90%, 85%, 80%, and the like. In some embodiments, the percentage is set to a value that encompasses "most" of the distances, such as 90% or higher. For example, the percentage may be set to ensure that anomalies or mistakes do not unduly affect the radius 130. In certain embodiments, the radius is set to the distance of the sorted distances that falls at the given percentage or, if no distance falls directly at the given percentage, to the next largest distance. For example, the radius may be set to the first distance in the sorted distances that is larger than 99.7% of the distances. In example 100, one of device locations 140 (e.g., which may be an anomaly or a mistake) is outside of region definition 110 defined by center point 120 and radius 130.

While certain embodiments involve setting the radius to a value larger than a percentage of the distances, it is noted that other techniques may be used to determine the radius. For example, a maximum, minimum, or average radial distance from the center point to device locations in location records may be used as the radius. In other embodiments, a statistical distributional approach may be used, which may involve fitting the distances to a certain known distribution, such as normal distribution, gamma distribution, or the like. In alternative embodiments, a Cartesian projection may be used to determine the radius. This may involve, for example, computing a maximum difference of x-coordinates of device locations from the center point, computing a maximum difference of y-coordinates of device locations from the center point, and setting the radius to the distance from the center point to the x,y coordinate pair.

Region definition 110 is used to provide location-based services to users. For example, a user of device 150 (e.g., a mobile phone) has enabled a location tracking service in an application on device 150. In some embodiments, the application accesses location tracking services from the native operating system (OS) of device 150 in order to perform location tracking. When device 150 enters the area defined by region definition 110, location-based services for the site may be provided to device 150. In one example, the user has enabled an automatic timekeeping feature, and the user is automatically clocked in to the site based on the presence of device 150 within region definition 110. In another example, the user is provided with a recommendation to clock into the site. In other examples, the user is provided with content, such as promotions or advertisements, related to the site. In certain embodiments, the user's presence within region definition 110 is recorded, such as for tax or accounting purposes.

In another embodiment, an owner of the site, such as a user that manages location-based services for the site, may be notified of the presence of device 150 in region definition 110. For example, the owner of the site may be provided with a prediction that the user is likely to clock in to the site or otherwise visit the site. The presence of device 150 in region definition 110 may also be tracked for various other purposes, such as statistical analysis of visitors to locations and updating radius 130.

Figure 2:
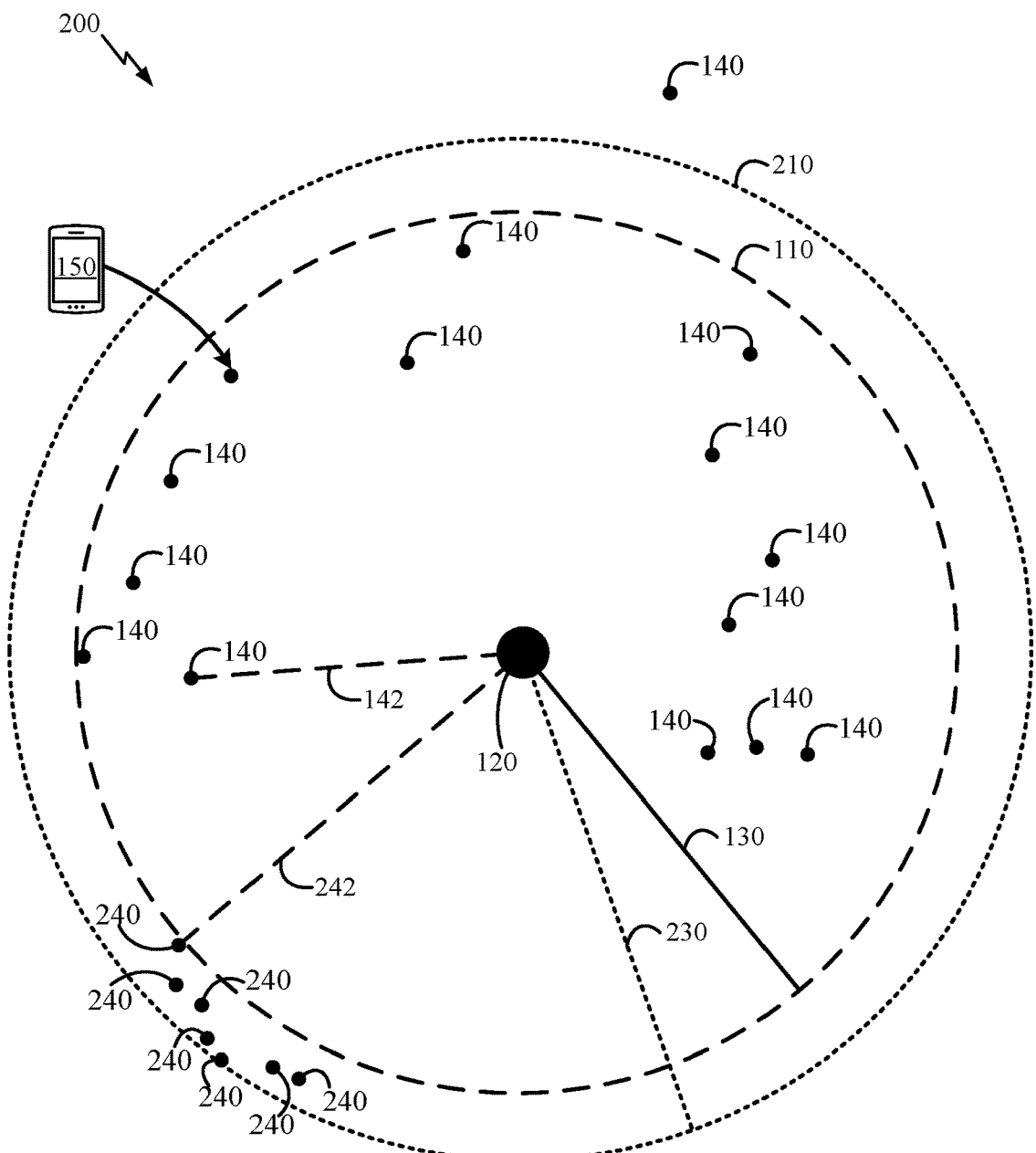
FIG. 2 depicts another example of dynamic location tracking.

FIG. 2 illustrates another example 200 of dynamic location tracking.

Example 200 includes region definition 110, center point 120, radius 130, device locations 140, and device 150 from example 100 of FIG. 1. Example 200 represents the same site as example 100 after a change in circumstances.

Each of device locations 240 represents coordinates of a devices of a user at a time that the user clocked into the site. Device locations 240 correspond to location records received after the location records corresponding to device locations 140. In one example, a new parking lot is opened for the site, and device locations 240 represent employees and/or visitors of the site parking in the new parking lot. Device locations 240 are outside of the area defined by region definition 110. As such, techniques described herein involve dynamically updating the radius of the region definition for the site based on device locations 240 so that location-based services can be more accurately provided for the site in view of the changed circumstances (e.g., new parking lot). In some embodiments, techniques described herein for dynamically updating a radius of a region definition are performed by a location tracking service, such as location tracking service 514 of FIG. 5A, described below. In one embodiment, an owner of the site represented by region definition 110 may have enabled a dynamic radius feature, indicating that radius 130 should automatically be updated over time based on location records. For example, the dynamic radius feature may be either enabled or disabled through a user interface. In other embodiments, the radius may not be automatically updated, and updated radius values may be provided to the owner of the site as recommendations that can either be accepted or rejected.

In particular, updated radius 230 is determined based on device locations 140 and device locations 240. Distances from center point 120 to each of device locations 240 are determined. For example, distance 242 from center point 120 to a given device location 240 is determined by calculating the Euclidean distance from center point 120 to the given device location.

The distances for device locations 140 and device locations 240 are sorted in ascending order, and updated radius 230 is set according to techniques described herein to a value such that at least a given percentage of the distances are less than or equal to updated radius 230. Updated radius 230 and center point 120 define updated region definition 210, which encompasses a predetermined percentage of device locations 140 and 240.

In some embodiments the region definition for the site is automatically set to updated region definition 210, while in other embodiments updated region definition 210 is recommended to an owner of the site. For example, the owner of the site may be provided with a notification indicating that an updated radius has been determined for the site based on new location records, and requesting confirmation that the region definition should be updated accordingly.

It is noted that, while some embodiments refer to clocking in and clocking out, such as for timekeeping purposes, other embodiments may involve location records based on other user actions, such as users "checking in" to a site (e.g., for social media purposes) or otherwise recording their presence at the site.

Example User Interface Related to Dynamic Location Tracking

Figure 3:
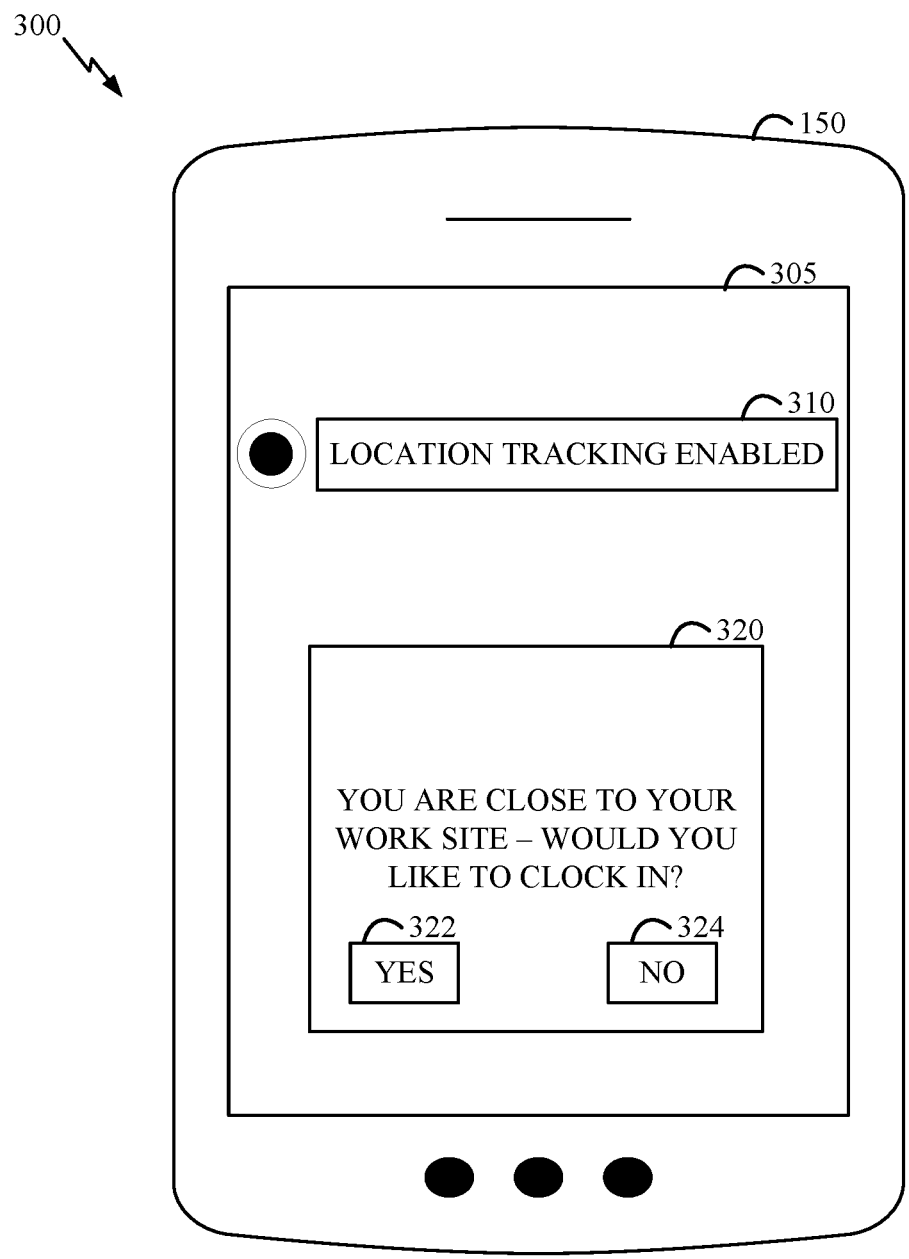
FIG. 3 depicts an example user interface related to dynamic location tracking.

FIG. 3 depicts an example 300 of a user interface related to dynamic location tracking. Example 300 includes device 150 of FIGS. 1 and 2.

User interface 305 displayed on device 150 represents a user interface of an application, such as an application that provides location-based timekeeping services. Control 310 indicates that location tracking has been enabled. For example, the user of device 150 may have selected control 310 in order to enable location-based services for which coordinates of device 150 are tracked, such as using a satellite positioning system associated with device 150 like GPS or GLONASS.

A notification 320 is displayed within user interface 305 reading "you are close to your work site—would you like to clock in?", and providing the user with controls 322 and 324 to select "yes" or "no". In certain embodiments, notification 320 is displayed within the application. In other embodiments, notification 320 is an OS-level notification that may be displayed outside of the application, such as on a home screen of a client device or via a general notification mechanism of the client device (e.g., a pop-up notification on a mobile device). In one example, notification 320 is displayed in response to a determination that device 150 has entered an area defined by region definition 110 of FIG. 1. If the user selects control 322, the application creates a location record in which the user is clocked into the site.

User interface 305 is included as one example, and other user interfaces and notifications may be provided based on techniques described herein. For example, a recommendation to clock out of the site may also be provided when it is determined that device 150 has exited the area defined by the region definition. In some embodiments, the user is provided with a control for enabling or disabling automatic timekeeping, for which the user will be automatically clocked in or out of the site based on entering or exiting the area defined by the region definition. Other types of content, such as promotions and advertisements, may also be provided via user interface 305 based on the location of device 150.

Example Operations for Dynamic Location Tracking

Figure 4:
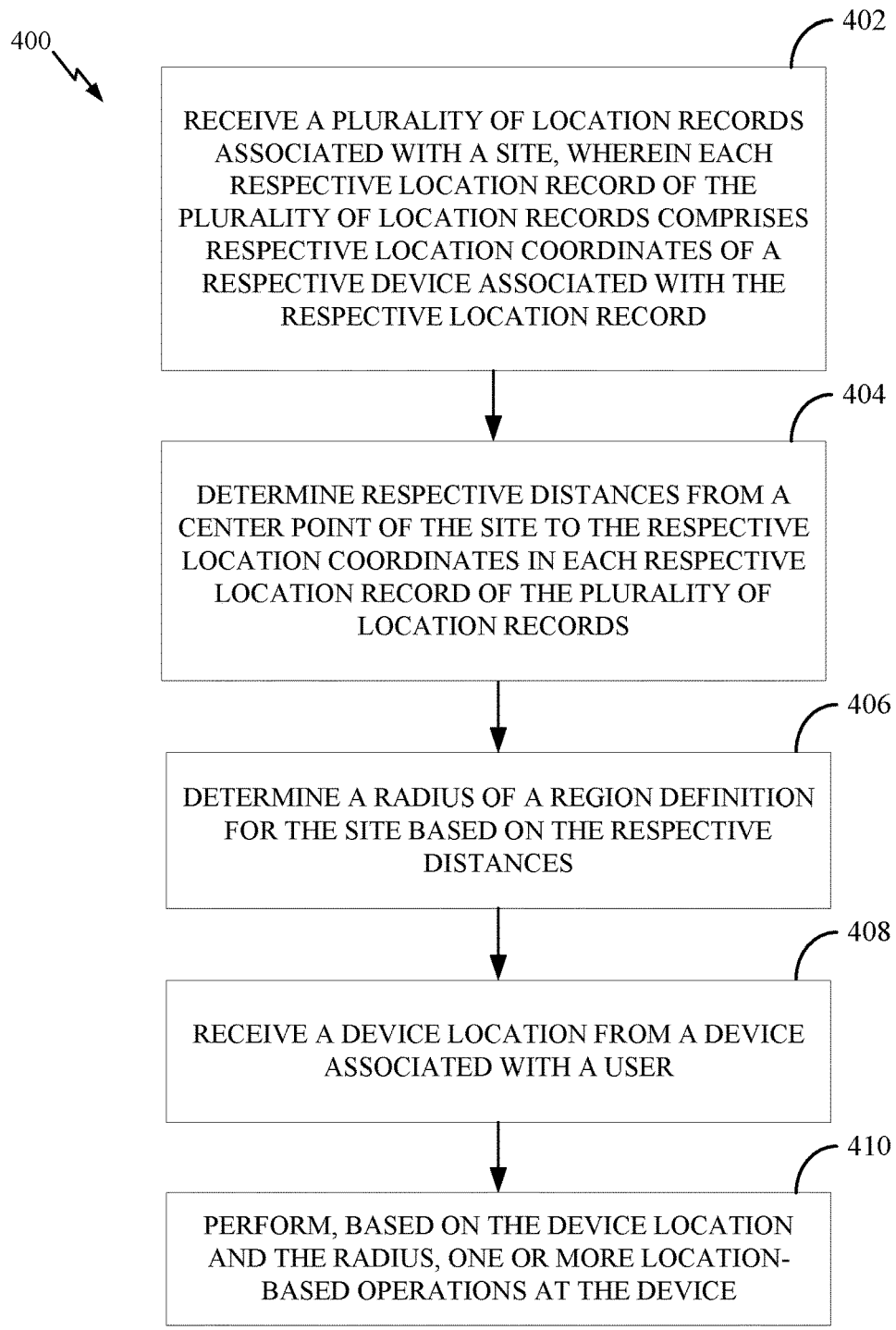
FIG. 4 depicts example operations for dynamic location tracking.

FIG. 4 depicts example operations 400 for dynamic location tracking. For example, operations 400 may be performed by location tracking service 514 and/or location tracking client 550 of FIG. 5, described below. In one example, operations 400 are performed by location tracking service 514 on system 500 of FIG. 5, which may represent a server that is remote from client devices through which users receive location-based services via client applications associated with location tracking service 514 of FIG. 5.

At step 402, a plurality of location records associated with a site is received, wherein each respective location record of the plurality of location records comprises respective location coordinates of a respective device associated with the respective location record. For example, the plurality of location records may correspond to instances in which users clocked in to the site (or otherwise made a record of their presence at the site) via devices at particular locations. The coordinates may, for instance, include latitude and longitude values indicating a geographic location of a device, such as determined using a satellite position system associated with the device, like GPS or GLONASS.

At step 404, respective distances are determined from a center point of the site to the respective location coordinates in each respective location record of the plurality of location records. The respective distances may be Euclidean distances. In some embodiments, the center point is defined by an owner of the site and/or based on a physical address of the site.

At step 406, a radius of a region definition for the site is determined based on the respective distances. In some embodiments, the radius is set to a value that is greater than or equal to at least a subset of the respective distances. For example, the respective distances may be sorted in ascending order, and the radius may be set to a value greater than or equal to a given percentage of the respective distances. Determining the radius may include determining a distance from the center point of the site that is greater than or equal to at least a given percentage of the respective distances and selecting the distance as the radius of the region definition for the site. The center point of the site may be determined based on an address of the site At step 408, a device location is received from a device associated with a user. For example, the device location may include coordinates of the device. In one example, the user enabled a location tracking feature on the device, and the device provided the device location to the location tracking service.

At step 410, based on the device location and the radius, one or more location-based operations are performed at the user device. In some embodiments, the location-based operations may include: automatically clocking the user into the site; automatically clocking the user out of the site; providing a recommendation related to the site to the user; providing content related to the site to the user; or generating a prediction that the user will clock into or out of the site. In one example, if it is determined that the device location is within the region definition defined by the radius, the user may be automatically clocked into the site or a recommendation to clock into the site may be provided to the user. Providing the recommendation related to the site to the user may comprise determining that the device location falls within the region definition and recommending that the user clock into the site. Alternatively, providing the recommendation related to the site to the user may comprise receiving a request to clock into the site from the user, determining that the device location falls outside of the region definition, and recommending that the user not clock into the site (or, alternatively, preventing the user from clocking into the site).

Some embodiments include receiving an additional plurality of location records associated with the site and determining an updated radius of the region definition for the site based on the additional plurality of location records. The updated radius may be recommended to a managing user associated with the site. In other embodiments, upon determining that a dynamic radius feature is enabled for the site, the radius of the region definition for the site is automatically set to the updated radius.

Example Computing Systems

Figure 5A:
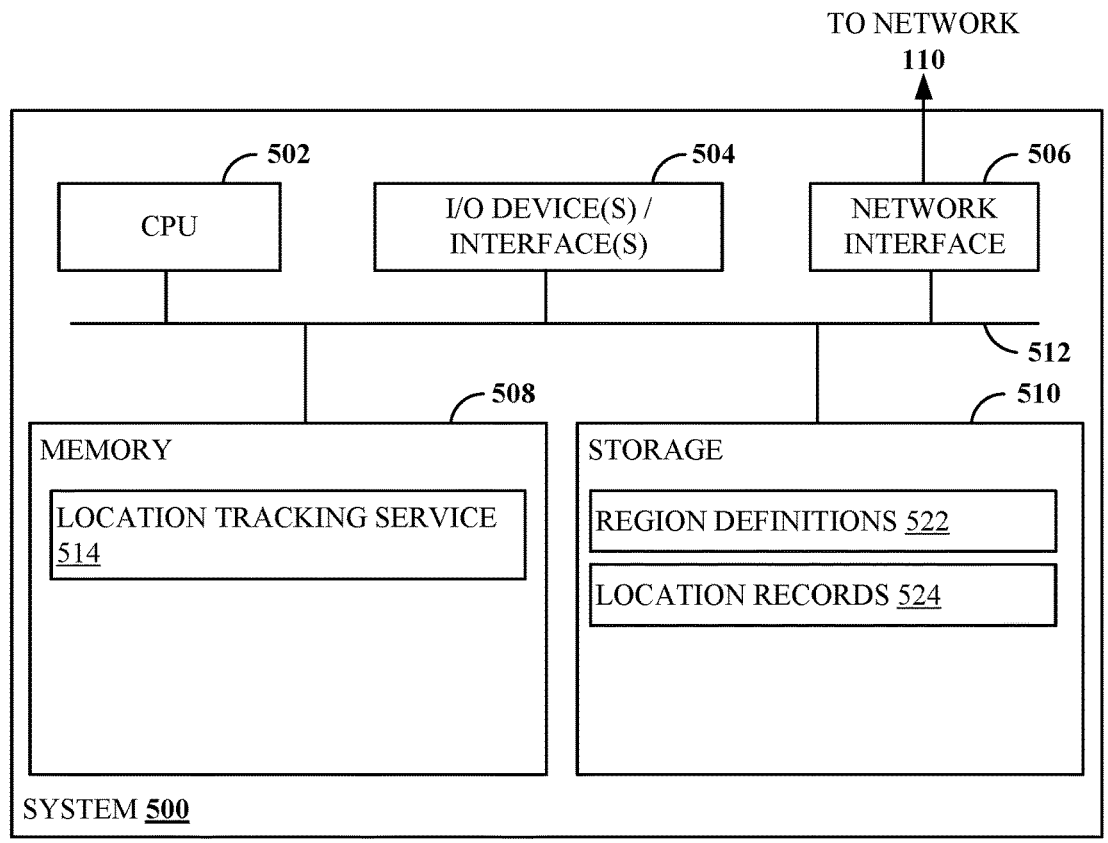
FIGS. 5A and 5B depict example computer systems with which embodiments of the present disclosure may be implemented.

FIG. 5A illustrates an example system 500 used for dynamic location tracking. For example, system 500 may be a server that performs operations related to dynamic location tracking, such as operations 400 of FIG. 4.

System 500 includes a central processing unit (CPU) 502, one or more I/O device interfaces 504 that may allow for the connection of various I/O devices 514 (e.g., keyboards, displays, mouse devices, pen input, etc.) to the system 500, network interface 506, a memory 508, storage 510, and an interconnect 512. It is contemplated that one or more components of system 500 may be located remotely and accessed via a network. It is further contemplated that one or more components of system 500 may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510. CPU 502 is included to be representative of a single CPU, multiple CPUs, a single CPU having multiple processing cores, and other arrangements.

Additionally, the memory 508 is included to be representative of a random access memory. As shown, memory 508 includes location tracking service 514, which may perform operations related to dynamic location tracking, such as operations 400 of FIG. 4. In some embodiments, location tracking service 514 is a server-side component of a client-server application, corresponding to the client-side component application 559 of FIG. 5B. For example, location tracking service 514 may be an application that provides one or more service based on location, such as a timekeeping application, an accounting or tax preparation application, a content serving application, or the like.

Storage 510 may be a disk drive, solid state drive, or a collection of storage devices distributed across multiple storage systems. Although shown as a single unit, the storage 510 may be a combination of fixed and/or removable storage devices, such as fixed disc drives, removable memory cards or optical storage, network attached storage (NAS), or a storage area-network (SAN).

Storage 510 comprises region definitions 522 (e.g., each comprising an identifier, coordinates of a center point, and a radius) and location records 524 (e.g., each comprising an identifier of a region definition, a device location, and, in some embodiments, other information such as a timestamp). For example, region definitions 522 and location records 524 may be stored and accessed by location tracking service 514.

Figure 5B:
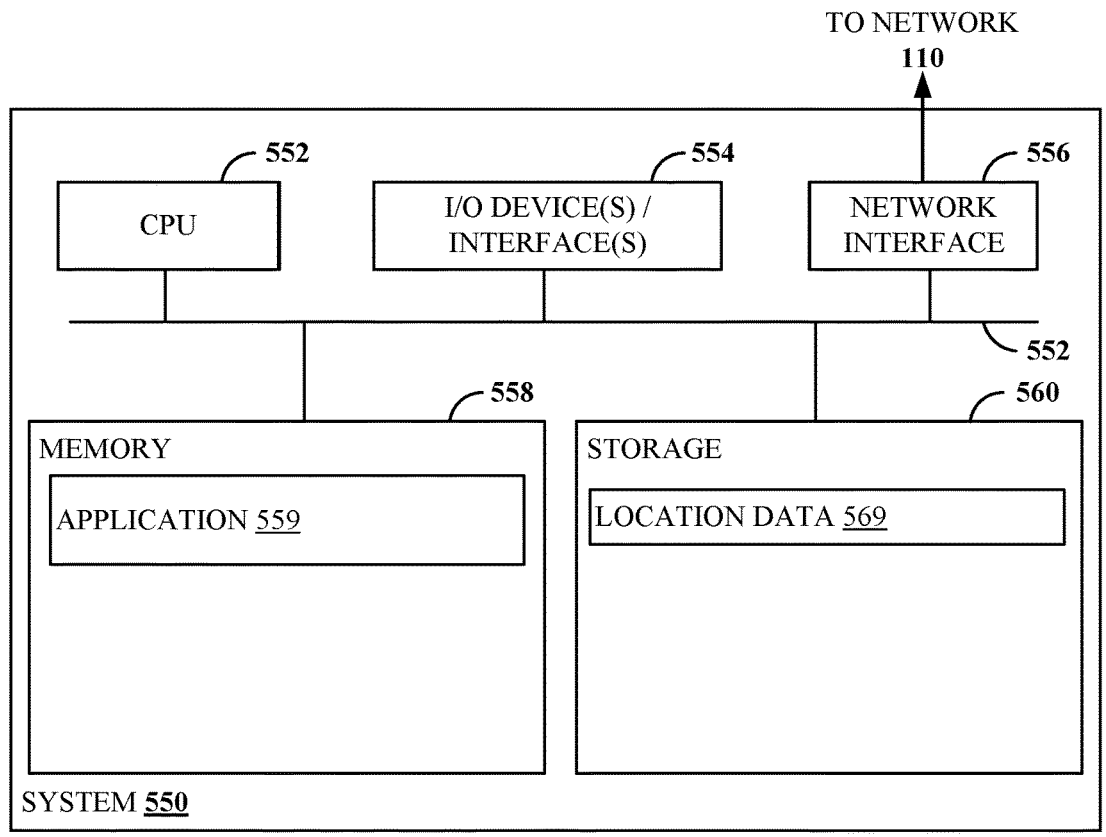

FIG. 5B illustrates an example system 550 used for dynamic location tracking. For example, system 550 may be representative of device 150 of FIG. 1.

System 550 includes a central processing unit (CPU) 552, one or more I/O device interfaces 554 that may allow for the connection of various I/O devices 554 (e.g., keyboards, displays, mouse devices, pen input, satellite-based positioning devices etc.) to the system 550, network interface 556, a memory 558, storage 560, and an interconnect 552. It is contemplated that one or more components of system 550 may be located remotely and accessed via a network. It is further contemplated that one or more components of system 550 may comprise physical components or virtualized components.

CPU 552 may retrieve and execute programming instructions stored in the memory 558. Similarly, the CPU 552 may retrieve and store application data residing in the memory 558. The interconnect 552 transmits programming instructions and application data, among the CPU 552, I/O device interface 554, network interface 556, memory 558, and storage 560. CPU 552 is included to be representative of a single CPU, multiple CPUs, a single CPU having multiple processing cores, and other arrangements.

Additionally, the memory 558 is included to be representative of a random access memory. As shown, memory 558 includes an application 559, which may provide (e.g., among other services) location-based services. In some embodiments, application 559 comprises a client-side component of a client-server application, corresponding to the server-side component location racking service 514. For example, a user may interact with application 559 via user interface 305 of FIG. 3 in order to access location-based services described herein.

Storage 560 may be a disk drive, solid state drive, or a collection of storage devices distributed across multiple storage systems. Although shown as a single unit, the storage 560 may be a combination of fixed and/or removable storage devices, such as fixed disc drives, removable memory cards or optical storage, network attached storage (NAS), or a storage area-network (SAN). As shown, storage 560 includes location data 569, which generally represents device location data for system 550, such as captured using a satellite positioning system.

It is noted that, while certain embodiments involve particular processing being performed by the server-side component location tracking service 514, other embodiments involve application 559 performing additional processing, such as determining when the device enters the area defined by a given region definition.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for dynamic location tracking, comprising:
   receiving a plurality of location records associated with a site, wherein each respective location record of the plurality of location records comprises respective location coordinates of a respective device associated with the respective location record;
   determining respective distances from a center point of the site to the respective location coordinates in each respective location record of the plurality of location records;
   selecting, as a radius of a region definition for the site, a distance from the center point of the site that is greater than or equal to a subset of the respective distances;
   receiving a device location from a device associated with a user; and
   performing, based on the device location and the region definition, one or more location-based operations.

2. The method of claim 1, wherein the one or more location-based operations comprise one or more of:
   automatically clocking the user into the site;
   automatically clocking the user out of the site;
   providing a recommendation related to the site to the user;
   providing content related to the site to the user; or
   generating a prediction that the user will clock into or out of the site.

3. The method of claim 2, wherein providing the recommendation related to the site to the user comprises:
   determining that the device location falls within the region definition; and
   recommending that the user clock into the site.

4. The method of claim 2, wherein providing the recommendation related to the site to the user comprises:
   receiving a request to clock into the site from the user;
   determining that the device location falls outside of the region definition; and
   recommending that the user not clock into the site.

5. The method of claim 1, further comprising determining the center point of the site based on an address of the site.

6. The method of claim 1, further comprising:
   receiving an additional plurality of location records associated with the site; and
   determining an updated radius of the region definition for the site based on the additional plurality of location records.

7. The method of claim 6, further comprising recommending the updated radius to a user associated with the site.

8. The method of claim 6, further comprising:
   determining that a dynamic radius feature is enabled for the site; and
   automatically setting the radius of the region definition for the site to the updated radius.

9. A method for dynamic location tracking, comprising:
   receiving an indication from a device associated with a user that an automatic clock-in feature is enabled;
   receiving a plurality of location records associated with a site, wherein each respective location record of the plurality of location records comprises respective location coordinates of a respective device associated with the respective location record;
   determining respective distances from a center point of the site to the respective location coordinates in each respective location record of the plurality of location records;
   sorting the respective distances in ascending order;
   determining a radius of a region definition for the site such that a subset of the respective distances are less than the radius;
   receiving a device location from the device associated with the user;
   determining that the device location is within the region definition based on the radius; and
   automatically clocking the user into the site based on the automatic clock-in feature.

10. The method of claim 9, further comprising:
    receiving an additional plurality of location records associated with the site; and
    determining an updated radius of the region definition for the site based on the additional plurality of location records.

11. The method of claim 10, further comprising recommending the updated radius to a user associated with the site.

12. The method of claim 10, further comprising:
    determining that a dynamic radius feature is enabled for the site; and
    automatically setting the radius of the region definition for the site to the updated radius.

13. A system, comprising one or more processors and a memory comprising instructions that, when executed by the one or more processors, cause the system to perform a method for dynamic location tracking, the method comprising:
    receiving a plurality of location records associated with a site, wherein each respective location record of the plurality of location records comprises respective location coordinates of a respective device associated with the respective location record;
    determining respective distances from a center point of the site to the respective location coordinates in each respective location record of the plurality of location records;
    determining a radius of a region definition for the site based on the respective distances by at least:
       determining a distance from the center point of the site that is greater than or equal to a given percentage of the respective distances; and
       selecting the distance as the radius of the region definition for the site;

receiving a device location from a device associated with a user; and performing, based on the device location and the region definition, one or more location-based operations.

14. The system of claim 13, wherein the one or more location-based operations comprise one or more of:
   automatically clocking the user into the site;
   automatically clocking the user out of the site;
   providing a recommendation related to the site to the user;
   providing content related to the site to the user; or
   generating a prediction that the user will clock into or out of the site.

15. The system of claim 14, wherein providing the recommendation related to the site to the user comprises:
   determining that the device location falls within the region definition; and
   recommending that the user clock into the site.

16. The system of claim 14, wherein providing the recommendation related to the site to the user comprises:
   receiving a request to clock into the site from the user;
   determining that the device location falls outside of the region definition; and
   recommending that the user not clock into the site.

17. The system of claim 13, wherein the method further comprises determining the center point of the site based on an address of the site.

18. The system of claim 13, wherein the method further comprises:
   receiving an additional plurality of location records associated with the site; and
   determining an updated radius of the region definition for the site based on the additional plurality of location records.

19. The system of claim 18, wherein the method further comprises recommending the updated radius to a user associated with the site.

20. The system of claim 18, wherein the method further comprises:
   determining that a dynamic radius feature is enabled for the site; and
   automatically setting the radius of the region definition for the site to the updated radius.

* * * * *